United States Patent [19]

Palma

[11] 4,425,406
[45] Jan. 10, 1984

[54] METHOD AND APPARATUS FOR PRODUCING LAMINATED GLASS

[75] Inventor: Horus P. Palma, Southfield, Mich.

[73] Assignee: Shatterproof Glass Corporation, Detroit, Mich.

[21] Appl. No.: 390,314

[22] Filed: Jun. 21, 1982

[51] Int. Cl.³ .................... B32B 17/00; B32B 31/00
[52] U.S. Cl. ................................. 428/12; 156/104; 156/106; 156/286; 156/382; 206/524.8; 428/266; 428/268; 428/429
[58] Field of Search ............... 156/62.2, 285, 286, 156/382, 104, 106; 428/214, 265, 266, 268, 35, 12, 429; 206/524.8

[56] References Cited
U.S. PATENT DOCUMENTS 2,331,297 10/1943 Bendix ............................. 156/382
3,008,214 11/1961 Foster et al. ....................... 428/12
3,405,019 10/1968 Seil et al. .......................... 156/286
3,523,056 8/1970 Horning ............................ 428/266
4,316,930 2/1982 Stengle ............................. 428/266
4,340,090 7/1982 Matsushita et al. ............... 428/266
4,342,803 8/1982 Stengle, Jr. ....................... 428/429

Primary Examiner—Edward C. Kimlin
Assistant Examiner—Timothy W. Heitbaink
Attorney, Agent, or Firm—William E. Nobbe

[57] ABSTRACT

For use in the manufacture of laminated safety glass, a vacuum bag in which the glass-plastic laminations are bonded together formed of fiber glass cloth having a layer of silicon-rubber applied to the outer surface thereof which seals the interstices between the glass fibers but leaves the interior surface of the bag bare and the individual glass fibers exposed for direct contact with the glass sheets during lamination.

4 Claims, 4 Drawing Figures

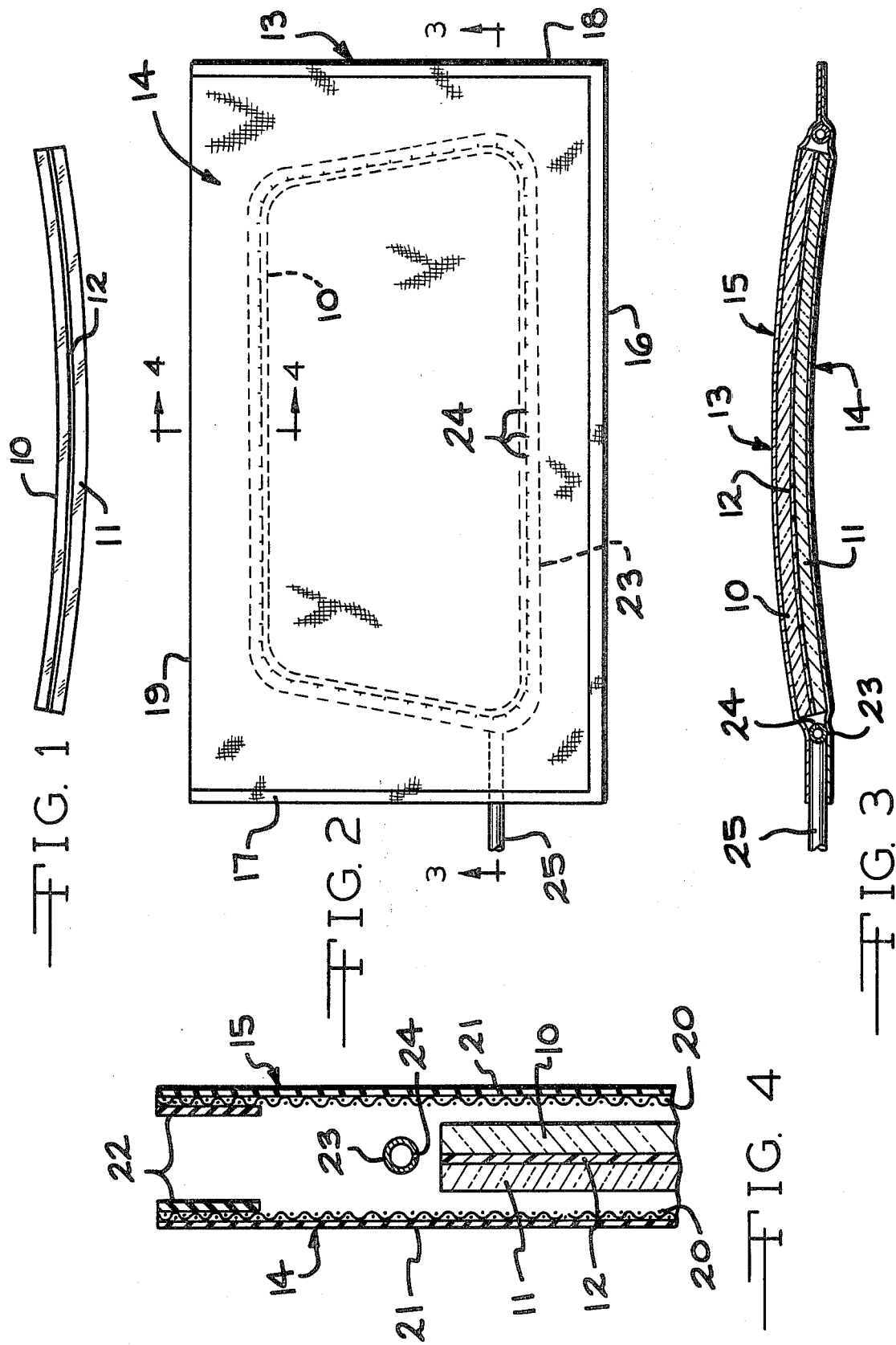

METHOD AND APPARATUS FOR PRODUCING LAMINATED GLASS

FIELD OF THE INVENTION

The present invention relates to a method and apparatus for producing laminated safety glass and, in particular, laminated automobile windshields, and the like.

BACKGROUND OF THE INVENTION

Automobile windshields ordinarily consist of two sheets of glass and an interposed layer of a thermoplastic material, such as polyvinyl butyral, bonded to one another by heat and pressure to form a composite unit. The bonding is usually accomplished in a two-step operation by first subjecting the assembled laminations to a preliminary pressing to remove the air from between the laminations and effect superficial bonding thereof, and then to a final heating and pressing in an autoclave filled with oil or air to completely bond the laminations together.

Different methods have been employed for initially removing the air from between the laminations. One of these consists in passing the glass-plastic assembly between squeeze rollers to force the entrapped air from between the laminations. Another is to provide a flexible channel shaped member in engagement with the marginal edge portions only of the assembly, in spaced relation to at least part of the periphery of the assembly, to provide a conduit through which the air can be withdrawn. Still another is to place the assembly in a flexible bag, seal the bag and apply a vacuum thereto to withdraw the air from within the bag as well as from between the laminations. These bags are usually formed of films or sheets of a plastic material, such as polyvinyl alcohol.

OUTLINE OF THE INVENTION

This invention is concerned with the so-called bagging method and has for its primary object the provision of a new and improved vacuum bag formed of a special material which will facilitate the evacuation of air from the bag interior and cause it to exert a uniform pressure on the entire surface of the glass sheets when vacuum is applied thereto, thereby permitting the escape of all of the air within the bag, as well as from between laminations.

Another object of the invention is to provide a laminating bag of the type disclosed in which it is possible not only to effect a preliminary pressing of the laminations but to completely laminate the glass-plastic assembly while retained within the bag.

The improved vacuum bag herein provided is formed of fiber glass cloth impregnated with a silicon-rubber sealant applied to the outer surface thereof.

Fiber glass cloth impregnated with silicon-rubber sealant is elastic and resilient and retains this characteristic under environmental demands that cause other elastomer compounds to fail. Such a bag is tougher and harder to tear in the vacuum lamination of glass windshields than bags heretofore used. Also, ozone aging has little or no affect on silicon-rubber fiber glass cloth. This silicon-rubber coated fiber glass bag can easily withstand higher temperatures, moisture and oxidation, qualities that are significant in the autoclave vacuum lamination of glass. Further, this composite bag contains no acid producing chemicals and is not corrosive.

BRIEF DESCRIPTION OF THE DRAWINGS

FIG. 1 is an end view of a glass-plastic assembly.

FIG. 2 is a front elevation of a vacuum bag provided by the invention in which the glass-plastic assembly, indicated in broken lines, is processed, FIG. 3 is a cross sectional view taken substantially on line 3—3 of FIG. 2, and FIG. 4 is an enlarged cross sectional view showing the bag construction and the glass-plastic assembly located therein taken substantially on line 4—4 of FIG. 2.

DETAILED DESCRIPTION

Referring to the drawings, there is disclosed in FIG. 1 a glass-plastic assembly representing an automobile windshield and composed of the top and bottom sheets of glass 10 and 11 and an interposed layer 12 of a thermoplastic material, such as polyvinyl butyral.

According to the invention, the three laminae 10, 11 and 12 are laid freely one upon the other in properly assembled relationship to form a sandwich and the assembly then introduced into the vacuum bag 13 shown in FIGS. 2 and 3. The bag is substantially rectangular and formed of the two side panels 14 and 15 sealed together along one side edge 16 and the two end edges 17 and 18. The other side edge 19 is left open and forms the entrance through which the laminated assembly is introduced into the bag.

As illustrated in FIG. 4, the side panels 14 and 15 of the bag are composed of sheets of fiber glass cloth 20 to the outer surfaces of which are applied a layer of silicon-rubber 21, preferably by spraying, which renders the side panels impervious to air and moisture. The silicon-rubber is air dried, being preferably of the RTV type.

To secure the side panels 14 and 15 together there is also applied to the inner surfaces thereof around the relatively narrow marginal portions a coating 22 of the silicon-rubber. The side edge 16 and end edges 17 and 18 of the panels are then brought together and pressed into sealing relation with one another, leaving the edge 19 open to receive the laminated assembly. The bag edges may be pressed together by hand, by mechanical means or in any other desired manner.

The laminated assembly is then placed within the bag 13 through the open edge 19 and a vacuum hose 23 arranged around the periphery of the assembly in spaced relation thereto. The hose 23 is provided with a series of spaced openings 24 and is connected to a vacuum pump (not shown) through an outlet hose 25.

The bag panels 14 and 15 at the open side 19 are then brought together and closed and a vacuum established in the bag. This vacuum will initially draw the edges of the panels into tight sealing engagement with one another and will then completely withdraw the air from within the bag, as well as from between the laminations through the hose 23.

While maintaining the vacuum thereon, the bag is placed in a sealed heating oven and subjected to a temperature sufficient to bring about a softening of the plastic interlayer 12 and superficial adhesion of the plastic interlayer to the glass sheets. By way of example, the assembly may be heated in the oven at a temperature of about 150° to 225° F. for a period of about 20 minutes.

The bag, with the vacuum still on, is then transferred from the oven to an autoclave wherein it is subjected to an air pressure in the neighborhood of 100 to 250 pounds per square inch for a period of about 10 minutes to effect final and complete bonding of the laminations throughout the entire area of the assembly. No additional heating is provided in the autoclave, the residual heat retained from the heating oven being sufficient. When the pressing cycle is completed, the bag is removed from the autoclave and the completed product removed from the bag. Thus the entire laminating process can be accomplished while the laminated assembly remains in the bag.

The silicon-rubber coating that is applied to the outside surface of the bag will seal the interstices between the glass fibers but will not completely penetrate them thereby leaving the inside surface of the bag bare and the individual fibers exposed as shown in FIG. 4. The exposed fibers form an uneven surface due to the weave and which, when brought into face-to-face contact with the glass sheets, result in innumerable small channels through which the air can escape. This greatly facilitates the total withdrawal of the air and causes the bag to exert uniformly distributed pressing force on the entire surfaces of the glass sheets so that breakage of the glass and the presence of air bubbles in the completed product are minimized.

While the invention is not restricted to the use of glass fiber cloth of any specific weave, it has been found that the glass fiber cloth supplied by J. P. Stevens & Co. of New York under No. 7628/38 performs very well in practice. This glass cloth weighs 6.00 oz. per square yard, has a thickness of 0.0065 inch, and a thread count of per square inch of 44 warp and 32 fill. The thickness of the silicon-rubber coating is in the neighborhood of 0.010 inch, with the overall thickness of the coated bag being about 0.017 inch.

It will be understood that the specific thicknesses, temperatures and pressures given above are by way of example only and that variations thereof may be resorted to without departing from the spirit of the invention or scope of the claims.

I claim:

1. For use in the manufacture of laminated glass including an assembly composed of two sheets of glass and an interposed layer of thermoplastic material, a flexible vacuum bag for receiving the assembly for lamination, said bag comprising side panels formed of fiber glass cloth, and a coating of silicon-rubber sealant applied to the outer surface only of said panels, wherein the coating of silicon-rubber seals the interstices between the glass fibers but leaves the inner surface of the side panels bare and the individual glass fibers exposed for direct contact with the glass sheets.

2. A silicon-rubber coated flexible fiber glass bag as claimed in claim 1, including means for withdrawing air from said bag as well as from between the laminations of said assembly.

3. A silicon-rubber coated flexible fiber glass bag as claimed in claim 1, in which the bag is adhesively sealed around the edges thereof, and including means located in said bag in surrounding relation to and spaced from said assembly for withdrawing air from said bag as well as from between the laminations of said assembly.

4. A silicon-rubber coated flexible fiber glass bag as claimed in claim 3, in which said means comprises a tubular member encircling said assembly in spaced relation thereto and having openings therein, and means connecting said tubular member to a source of vacuum.

* * * * *